United States Patent
Miyazaki et al.

(10) Patent No.: US 6,804,568 B1
(45) Date of Patent: *Oct. 12, 2004

(54) 3-D CAD/CAM DATA TRANSFER METHOD, 3-D CAD APPARATUS, 3-D CAM APPARATUS, 3-D CAD/CAM APPARATUS, NC PROCESS APPARATUS, AND STORAGE MEDIUM

(75) Inventors: Kouichi Miyazaki, Fujisawa (JP); Noboru Oouchi, Nasu-gun (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 424 days.

(21) Appl. No.: 09/612,956

(22) Filed: Jul. 10, 2000

(30) Foreign Application Priority Data

Jul. 15, 1999 (JP) .......................................... 11-201972

(51) Int. Cl.[7] .............................................. G06F 19/00
(52) U.S. Cl. ........................... 700/98; 700/182; 700/17; 703/2
(58) Field of Search ......................... 700/118–120, 182, 700/17, 180, 98, 100, 101; 703/2

(56) References Cited

U.S. PATENT DOCUMENTS 5,239,477 A * 8/1993 Matsumura et al. ........ 700/180
6,165,406 A * 12/2000 Jang et al. .................. 264/308

* cited by examiner

Primary Examiner—Leo Picard
Assistant Examiner—Kidest Bahta
(74) Attorney, Agent, or Firm—Oblon, Spivak, McClelland, Maier & Neustadt, P.C.

(57) ABSTRACT

A 3-D CAD apparatus is provided with a color attribute addition section for adding color attribute to a portion of 3-D model data, at which a casted material is to be subjected to a process. A 3-D CAM is provided with a recognition section for recognizing the portion at which the casted material is to be subjected to the process, on the basis of the color attribute added to the 3-D model data.

18 Claims, 5 Drawing Sheets

| PROCESS TYPE | SURFACE ROUGHNESS OR HOLE TYPE | ALLOWANCE | COLOR |
|---|---|---|---|
| SURFACE | △ | — | BLUE |
| | △△ | — | GREEN |
| HOLE | DRILL HOLE | — | ORANGE |
| | REAMER HOLE | HIGH PRECISION | PURPLE |
| | TAP HOLE | — | RED |
| | TAPERED HOLE | | YELLOW |
| | STEPPED HOLE | | PINK |
| · | · | · | · |
| · | · | · | · |
| · | · | · | · |

3-D CAD/CAM DATA TRANSFER METHOD, 3-D CAD APPARATUS, 3-D CAM APPARATUS, 3-D CAD/CAM APPARATUS, NC PROCESS APPARATUS, AND STORAGE MEDIUM

CROSS-REFERENCE TO RELATED APPLICATIONS

This application is based upon and claims the benefit of priority from the prior Japanese Patent Application No. 11-201972, filed Jul. 15, 1999, the entire contents of which are incorporated herein by reference.

BACKGROUND OF THE INVENTION

The present invention relates to a 3-D CAD (Computer-Aided Design)/CAM (Computer-Aided Manufacturing) apparatus for generating NC data for processing a work from 3-D model data produced by a 3-D CAD apparatus.

In particular, this invention relates to a 3-D CAD/CAM data transfer method for data transfer between a 3-D CAD apparatus and a 3-D CAM apparatus, as well as the 3-D CAD apparatus, the 3-D CAM apparatus, a 3-D CAD/CAM apparatus, an NC process apparatus to which the 3-D CAD/CAM apparatus is applied, and a storage medium storing programs of the 3-D CAD/CAM data transfer method.

A 3-D CAD/CAM apparatus has been utilized in product manufacturing process, for example, in steps from product design to forming of casted components, etc.

Figure 1:
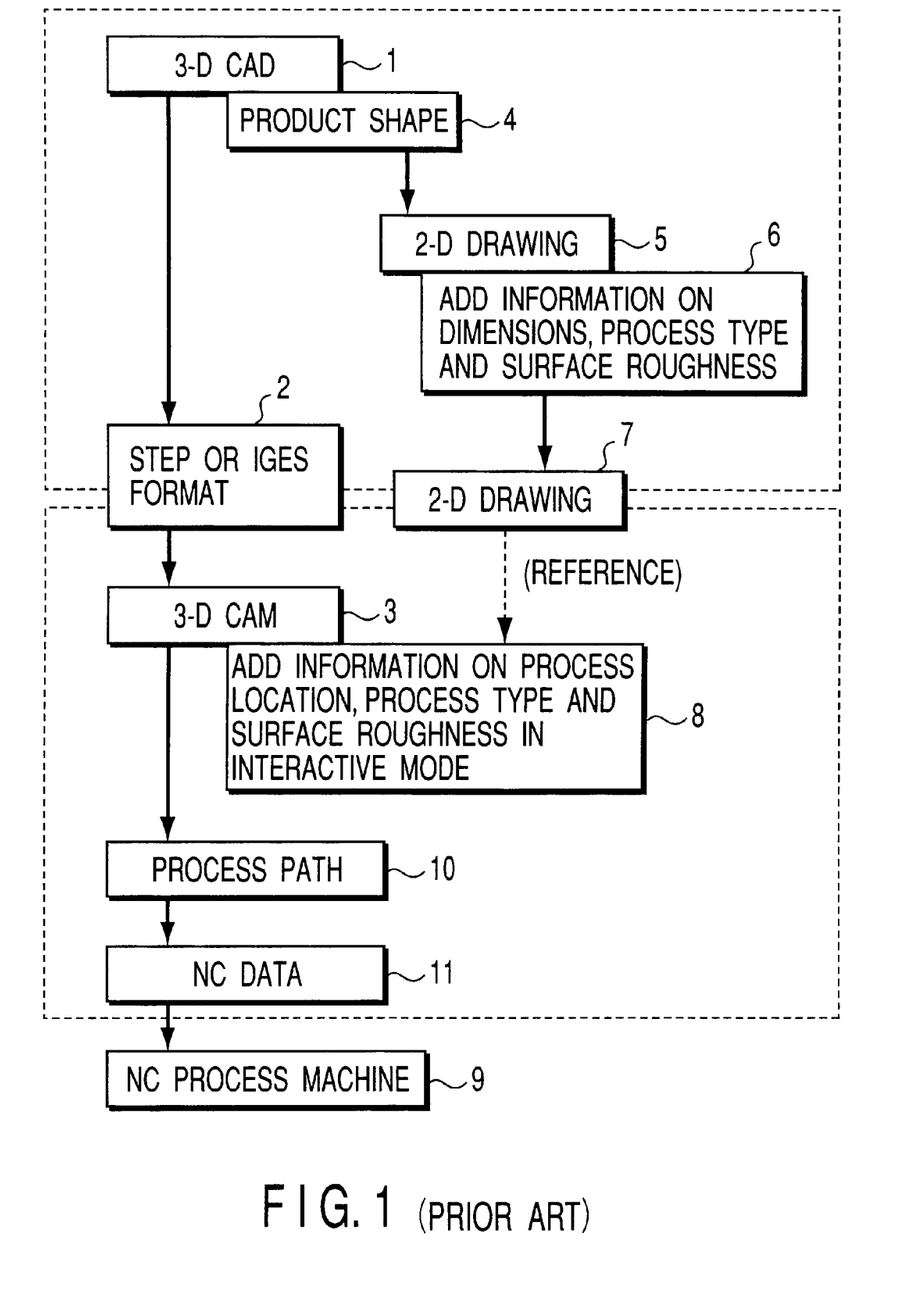
FIG. 1 is a view for describing the operation of a conventional 3-D CAD/CAM apparatus.

The steps in the manufacturing process will now be described in brief with reference to FIG. 1. To start with, product design is carried out using a 3-D CAD apparatus 1 in a design division, and a 3-D CAD model of the product is prepared.

3-D model data of the 3-D CAD model is converted by a standardized data exchange format 2 such as IGES or STEP. The converted data is sent to a 3-D CAM APPARATUS 3.

In parallel with this, a product shape 4 is converted to a 2-D drawing (design drawing) 5 by a designer using the 3-D CAD apparatus 1. Information 6 on items such as dimensions, process type and surface roughness is described on the 2-D drawing 5, and thus another 2-D drawing 7 is prepared.

On the other hand, the 3-D CAM APPARATUS 3 receives 3-D model data from the 3-D CAD apparatus 1. With reference to the 2-D drawing 7, this 3-D model data is combined with information 8 on items such as a process location, a process type and surface roughness in an interactive mode with a manufacturing engineer.

The 3-D CAM APPARATUS 3 acquires development data, etc. of the product from the 3-D model data is combined with the information 8 on items such as a process location, a process type and surface roughness. On the basis of the development data, the 3-D CAM apparatus 3 calculates a path (process path) of a tool such as a cutter in an NC process machine. NC data 11 for actuating the NC process machine 9 and performing an NC process is generated from the cutter path 10.

In this 3-D CAD/CAM apparatus, 3-D model data is converted by the data exchange format 2 such as IGES or STEP, and the converted data is transferred from the 3-D CAD apparatus 1 to the 3-D CAM apparatus 3.

Figure 2:
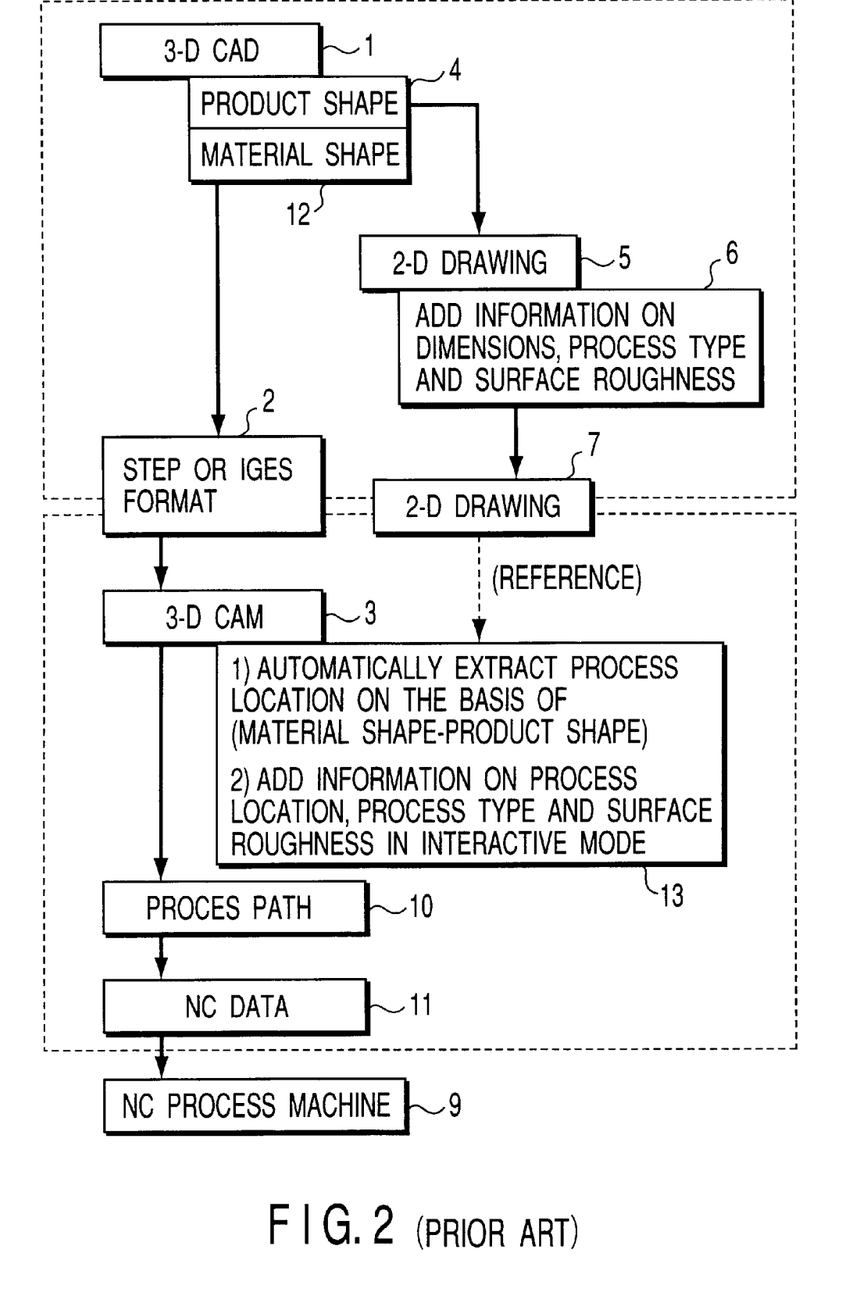
FIG. 2 is a view for describing the operation of a conventional 3-D CAD/CAM apparatus.

There is also known a apparatus, as shown in FIG. 2, which has a function wherein a material shape (or work shape) 12 as well as the product shape 4 is transferred to the 3-D CAM apparatus 3, and the 3-D CAM apparatus 3 performs an arithmetic operation of (material shape—product shape) and automatically recognizes (13) a process location. "A-B" indicates to cut off essential shape B from foundation shape A. Model data representing the essential shape is called like a "feature".

With the current data exchange standard, IGES or STEP, however, the product shape can be transferred to the 3-D CAM apparatus 3 as 3-D model data, but information on items such as a process type indicating a process to be carried out, and a dimensional tolerances, cannot be de transferred to the 3-D CAM apparatus 3.

Under the circumstances, the designer, after designing the product shape 4 and component shapes using the 3-D CAD apparatus, has to take the trouble to convert the acquired 3-D model data to the 2-D drawing 5 and to describe the information on the dimensions, surface roughness and tolerances on the 2-D drawing 5.

Moreover, the manufacturing engineer is required to determine the process location and process type by referring to the 2-D drawing 7 on which the dimensions, surface roughness and tolerances are described, and to produce the process path 10 by operating the 3-D CAM apparatus 3 in the interactive mode.

On the other hand, in order to adopt the method of performing the arithmetic operation of material shape product shape in the 3-D CAM apparatus 3, the material shape 12, too, needs to be produced on the 3-D CAD apparatus 1. No problem arises if the material shape 12 can be defined by blocks as in the case of mold and die. However, in the case of a mold components with a complex shape such as a casted components, many steps are required to produce the material shape 12.

Furthermore, in the above method, information on the process type and tolerances cannot be obtained on the basis of the process location extracted from the 3-D model data. Consequently, software for automatically determining the process type needs to be used, or a work for adding process information by referring to the 2-D drawing 7, as mentioned above, needs to be performed.

BRIEF SUMMARY OF THE INVENTION

An object of the present invention is to provide a 3-D CAD/CAM data transfer method capable of transferring process information such as a process location, a process type and an tolerances by directly using 3-D model data, without the need to produce a material shape or a 2-D drawing.

Another object of the present invention is to provide a 3-D CAD apparatus capable of adding process information such as a process location, a process type and tolerances to 3-D model data, without the need to produce a material shape or a 2-D drawing.

Still another object of the invention is to provide a 3-D CAM apparatus capable of extracting process information such as a process location, a process type and tolerances from 3-D model data transferred from a 3-D CAD apparatus.

Still another object of the invention is to provide a 3-D CAD/CAM apparatus capable of adding process information such as a process location, a process type and tolerances to 3-D model data, and extracting the process information such as a process location, a process type and tolerances from the 3-D model data, without the need to produce a material shape or a 2-D drawing.

Still another object of the invention is to provide an NC process apparatus for performing an NC process, with application of a 3-D CAD/CAM apparatus capable of adding process information such as a process location, a process type and tolerances to 3-D model data, and extracting the process information such as a process location, a process type and tolerances from the 3-D model data, without the need to produce a material shape or a 2-D drawing.

Still another object of the invention is to provide a storage medium storing programs of a 3-D CAD/CAM data transfer method capable of transferring process information such as a process location, a process type and tolerances by directly using 3-D model data, without the need to produce a material shape or a 2-D drawing.

In order to achieve the above objects, according to a first aspect of the present invention, there is provided a data transfer method for transferring 3-D model data representing a 3-D model of a product to a 3-D CAM apparatus, the method comprising the steps of:

adding at least one of color attribute and line attribute corresponding to a process, as attribute data, to data of the 3-D model data, which data relates to a portion where the product represented by the 3-D model data is to be subjected to the process; and storing the 3-D model data including the added attribute data in a file for use by the 3-D CAM apparatus, thereby transferring the 3-D model data including the added attribute data to the 3-D CAM apparatus.

According to a second aspect of the invention, there is provided a 3-D CAD apparatus comprising:

means for generating 3-D model data representing a 3-D model of a product; and means for adding at least one of color attribute and line attribute corresponding to a process, as attribute data, to data of the generated 3-D model data, which data relates to a portion where the product represented by the 3-D model data is to be subjected to the process.

According to a third aspect of the invention, there is provided a 3-D CAM apparatus comprising:

means for reading out 3-D model data representing a 3-D model of a product, the 3-D model data being stored in a file, wherein at least one of color attribute and line attribute corresponding to a process is added, as attribute data, to data of the generated 3-D model data, which data relates to a portion of the product represented by the 3-D model data, at which portion the product is to be subjected to the process; and means for recognizing the portion of the product, at which the product is to be subjected to the process, on the basis of the attribute data added to the read-out 3-D model data.

According to a fourth aspect of the invention, there is provided a 3-D CAD/CAM apparatus comprising:

a CAD apparatus; and a CAM apparatus connected to the CAD apparatus over a network, wherein the CAD apparatus comprises:

means for generating 3-D model data representing a 3-D model of a product, and means for adding at least one of color attribute and line attribute corresponding to a process, as attribute data, to data of the generated 3-D model data, which data relates to a portion where the product represented by the 3-D model data is to be subjected to the process, and means for storing the 3-D model data including the added attribute data in a file for use by the CAM apparatus, and the CAM apparatus comprises:

means for recognizing the portion of the product, at which the product is to be subjected to the process, on the basis of the attribute data added to the 3-D model data stored in the file.

According to a fifth aspect of the invention, there is provided an NC process apparatus comprising:

a 3-D CAD apparatus for generating 3-D model data representing a 3-D model of a product, and adding at least one of color attribute and line attribute corresponding to a process, as attribute data, to data of the generated 3-D model data, which data relates to a portion where the product is to be subjected to the process;

a 3-D CAM apparatus for generating a process path for fabricating the product, on the basis of the attribute data added to the 3-D model data in the 3-D CAD apparatus, and generating NC data from the generated process path; and an NC process machine for machining a work on the basis of the NC data generated by the 3-D CAM apparatus.

According to a 6th aspect of the invention, there is provided a computer readable medium comprising:

model data having a color attribute, wherein the color attribute is associated with at least one of a manufacturing process for a surface of an article and a specification of the surface.

According to a 7th aspect of the invention, there is provided a computer readable medium comprising:

model data having a line attribute, wherein the line attribute is associated with at least one of a manufacturing process for a surface of an article and a specification of the surface.

According to an 8th aspect of the invention, there is provided a method of generating a model data comprising the step of:

adding data representing at least one surface of an article to color attributes being associated with a manufacturing process for a surface of the model.

According to a 9th aspect of the invention, there is provided a method of generating a model data comprising the step of:

adding data representing at least one surface of an article to color attributes being associated with specification of surfaces of the article.

According to a 10th aspect of the invention, there is provided a method of generating a model data comprising the step of:

adding line attributes being associated with at least one of specification of surfaces of an article and a manufacturing process for the surfaces of the model to at least one surface data representing a surface of the article.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will now be described with reference to the accompanying drawings.

Figure 3:
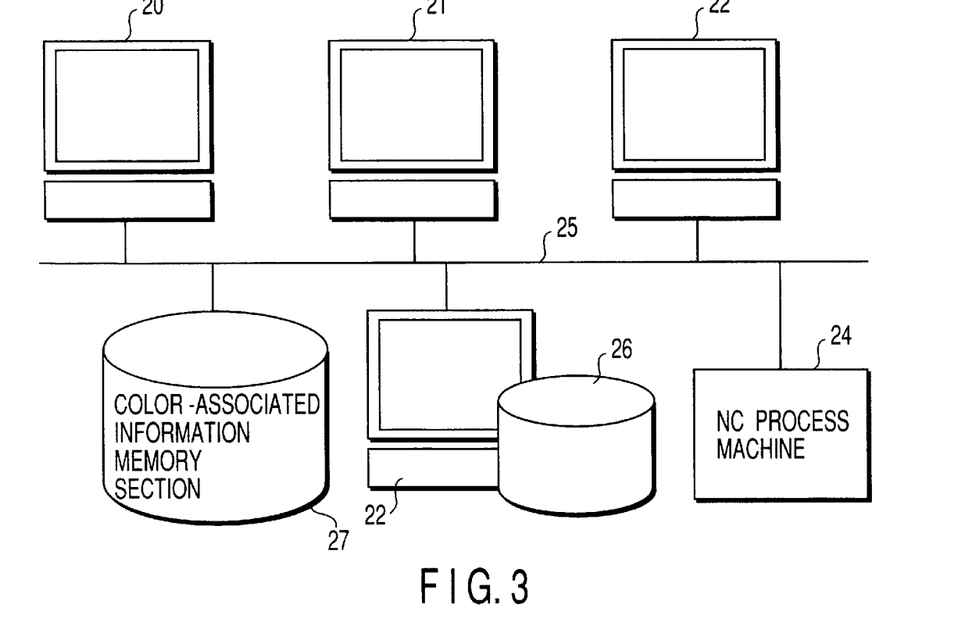
FIG. 3 shows an entire structure of an NC process apparatus to which an embodiment of a 3-D CAD/CAM apparatus according to the present invention is applied.

FIG. 3 shows an entire structure of an NC process apparatus to which an embodiment of a 3-D CAD/CAM apparatus according to the present invention is applied.

A 3-D CAD apparatus 20, a 3-D CAM apparatus 21, a CAD/CAM file server computer 22, a data transfer apparatus (DNC) 23 and an NC process machine 24 are interconnected over a communication line 25.

Figure 4:
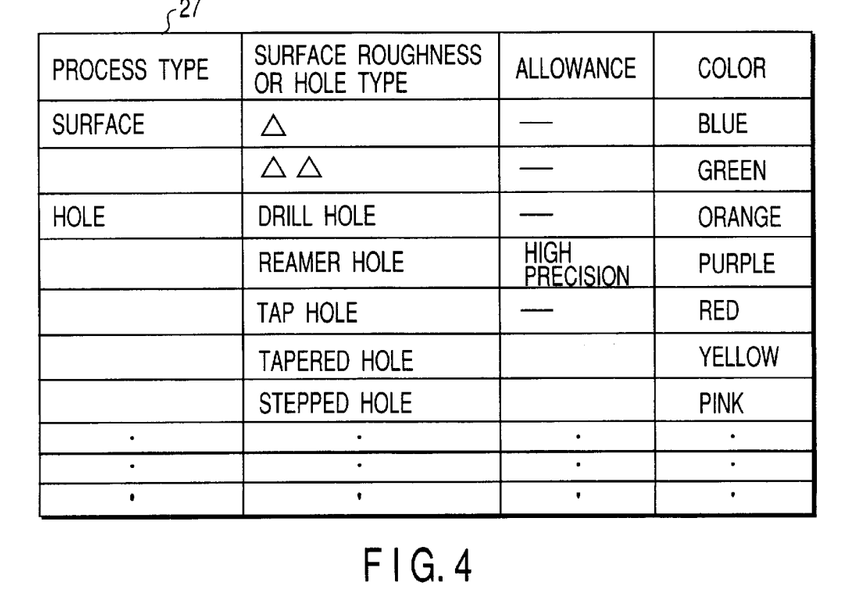
FIG. 4 is a diagram illustrating a color-associated information memory section in the NC process apparatus.

The CAD/CAM file server computer 22 is provided with a process database 26 and a color-associated information memory section 27 as illustrated in FIG. 4.

Figure 5:
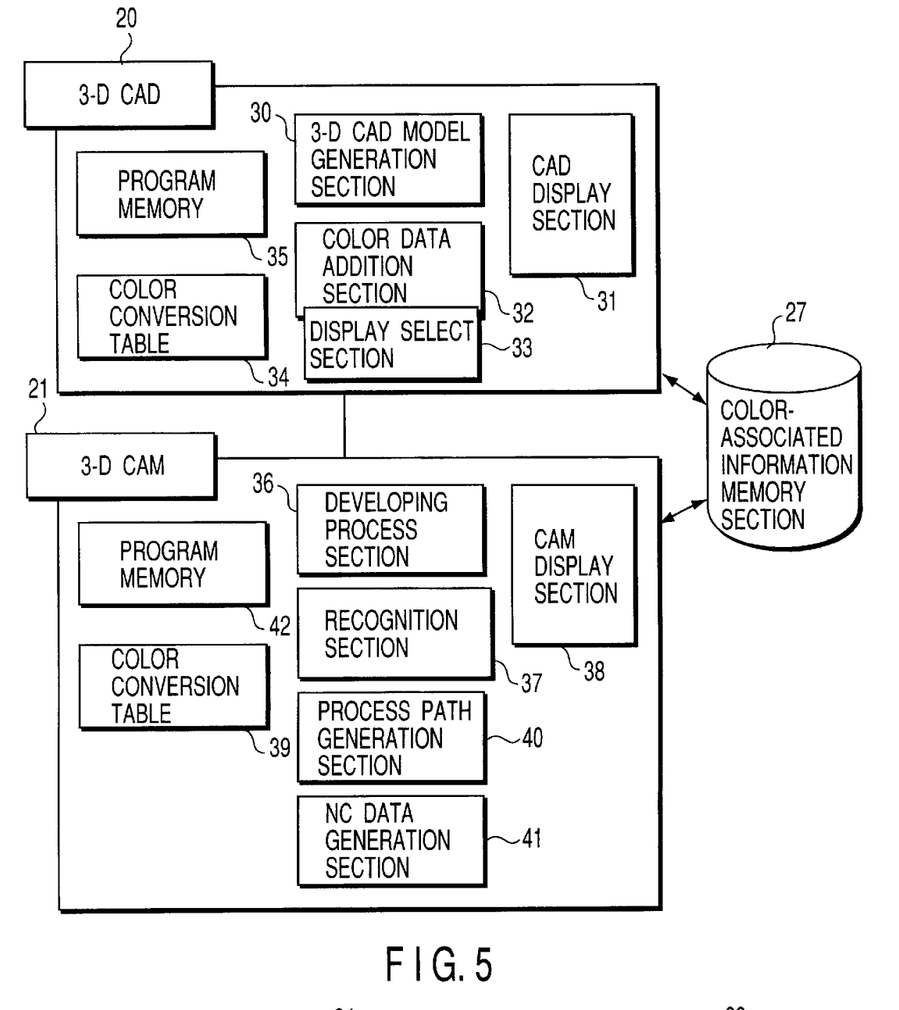
FIG. 5 is a functional block diagram of the 3-D CAD/CAM in the NC process apparatus.

FIG. 5 is a functional block diagram of the 3-D CAD apparatus 20 and 3-D CAM apparatus 21.

The 3-D CAD apparatus 20 designs a 3-D CAD model of a product by solid-modeling, converts solid data of the 3-D CAD model by means of a data exchange format such as IGES or STEP, and transfers the converted data to the 3-D CAM apparatus 21. The 3-D CAD apparatus 20 has functions of a 3-D CAD model generation section 30 and a color attribute addition section 32.

The 3-D CAD model generation section 30 has a function of designing the product, while generating the 3-D CAD model by solid-modeling in an interactive mode with the operator, using a solid modeler for 3-D product designing.

The 3-D CAD model, which is being designed, is displayed on a CAD display section 31 such as a display along with the content of a conversation with the operator.

The color attribute addition section 32 has a function of selecting color attribute and adding it to a surface of the 3-D model data generated by the 3-D CAD model generation section 30.

Specifically, the 3-D model data comprises a plurality of planes, and each of the planes has attributes. The attributes are, for example, information on a shape, and a color, a line and a surface of a component.

Of these attributes, the color is adopted by the color attribute addition section 32. On the basis of color-associated information stored in the color-associated information memory section 27, the color attribute addition section 32 selects color attribute of one of blue, green, orange, etc. and adds the selected color attribute to a portion, which requires processing, of the 3-D model data of a work generated by the 3-D CAD model generation section 30. The portion which requires processing (hereinafter referred to as "process-requiring portion") is one or both of a location of the work, at which an NC process is to be performed (for example, a surface to be processed or a hole to be processed) and a location at which process precision is to be measured.

Needless to say, the color attribute used as the attribute does not vary the shapes of planes constituting the 3-D model data.

The color attribute addition section 32 has, in addition to the function of indicating the location for the NC process by the color attribute on the basis of the color-associated information stored in the color-associated information memory section 27, a function of discriminating, by the color attribute, at least the data on the process type, surface roughness and tolerances relating to the location for the NC process.

In the color-associated information memory section 27, as shown in FIG. 4, the process type includes "SURFACE", "HOLE", etc. The grade of the surface roughness of a surface to be processed is indicated by "Δ" or "ΔΔ" or "5" [μm Rmax]. The hole type includes "DRILL HOLE", "REAMER HOLE", "TAP HOLE", "TAPERED HOLE" and "STEPPED HOLE." The tolerances are indicated by "HIGH PRECISION" for "REAMER HOLE". The colors including "BLUE", "GREEN", "ORANGE", "PURPLE", "RED", "YELLOW" and "PINK" are assigned to the process types of "SURFACE" and "HOLE".

The color attribute addition section 32 is provided with a display select section 33. The display select section 33 has a function of displaying menus or icons for color attribute selection on a CAD screen of the CAD display section 31 of the 3-D CAD apparatus 20.

The expression format of color attributes may be designated not only by the above-described text data, but also by a method using HTML (Hyper Text Mark-up Language), wherein the gray-scales of each color of RGB are designated by numerical values from 00 to FF. In the latter case, the color can be designated in hexadecimal numerals, like "#A079F1." In this case, since the color itself is indicated by the code, there may be a case where a color conversion table, as will be described below, is not an indispensable structural element, depending on the functions of the CAD/CAM apparatus.

Specifically, the menus or icons indicate, as individual items, the process types such as the surface process or hole process, the level of surface roughness, and tolerances. By the select operations performed with the designer in the interactive mode, color attribute on the process type, such as a surface process or a hole process, the level of surface roughness and tolerances is automatically set.

The display select section 33 has a function for confirming whether the information on the process type, the level of surface roughness and tolerances has been exactly set, following the addition of the color attribute to the 3-D model data. With this function, if a colored portion on the CAD screen is selected, the set information on the process type, the level of surface roughness and tolerances is displayed on the CAD screen of the CAD display section 31.

Figure 6:
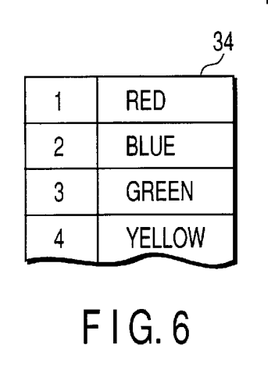
FIG. 6 is a diagram illustrating a color conversion table in the 3-D CAD apparatus in the NC process apparatus.

A color conversion table 34 serves to code colors in order to enable the 3-D CAD apparatus 20 to recognize the color attribute. For example, as shown in FIG. 6, red is coded into "1", blue into "2", and green into "3".

A program memory 35 stores programs necessary for the operations of the 3-D CAD apparatus 20. With these programs, a 3-D CAD model of a product is designed by modeling, 3-D model data of the 3-D CAD model is converted by the data exchange format 2 such as IGES or STEP, and the converted data is transferred to the 3-D CAM apparatus 21.

The program memory 35 also stores a program for operating the color attribute addition section 32.

On the basis of color-associated information stored in the color-associated information memory section 27, the color attribute addition section 32 selects color attribute (e.g. blue, green, orange) and adds the selected color attribute to a portion, which requires processing, of the 3-D model data of a work generated by the 3-D CAD model generation section 30. The process-requiring portion of the 3-D model data is one or both of a location of the work, at which an NC process is to be performed (for example, a surface to be processed or a hole to be processed) and allocation at which process precision is to be measured.

In addition, on the basis of the color-associated information stored in the color-associated information memory section 27, the color attribute addition section 32 discriminates, by the color attribute, at least the data on the process type, surface roughness and tolerances relating to the location for the NC process.

Furthermore, the 3-D CAD apparatus 20 comprises a normal coloring section for displaying, on the CAD screen, portions of the product represented by the 3-D model data (for example, portions of a casted work) with different associated colors; the color attribute addition section 32 for adding color attribute to process-requiring portions of the work in the 3-D model data and displaying resultant data on the CAD screen, as described above; and a switching section for switching between the normal coloring section and the color attribute addition section 32.

On the other hand, the 3-D CAM apparatus 21 receives the 3-D model data from the 3-D CAD apparatus 20. The 3-D CAM apparatus 21 functions to generate, from the 3-D model data, NC data for actuating the NC process machine 24 and performing the NC process. The 3-D CAM apparatus 21 has functions of a developing process section 36 and a recognition section 37.

The developing process section 36 develops product data on the basis of the data obtained by converting the 3-D model data from the 3-D CAD apparatus 20 by means of the data exchange format such as IGES or STEP, and thus acquires the developed product data. The developing process section 36 displays the developed data on the CAM screen of the CAM display section 38.

The recognition section 37 discriminates the color attribute added by the 3-D CAD apparatus 20 from the developed data obtained by the developing process section 36. The recognition section 37 adds the discriminated color attribute to the developed data displayed on the CAM screen of the CAM display section 38, and thus displays the colored developed data.

Thereby, the manufacturing engineer is enabled to recognize the process-requiring portion of the 3-D model data of the work by color display of blue, green, orange, etc. This process-requiring portion is one or both of a location of the work, at which an NC process is to be performed (for example, a surface to be processed or a hole to be processed) and a location at which process precision is to be measured.

The recognition section 37 has the function of discriminating the color attribute added by the 3-D CAD apparatus 20 from the developed data obtained by the developing process section 36. In addition, the recognition section 37 has a function of recognizing, on the basis of color-associated information stored in the color-associated information memory section 27, at least the process type, surface roughness and tolerances of one or both of a location of the work, at which an NC process is to be performed (for example, a surface to be processed or a hole to be processed) and a location at which process precision is to be measured.

Figure 7:
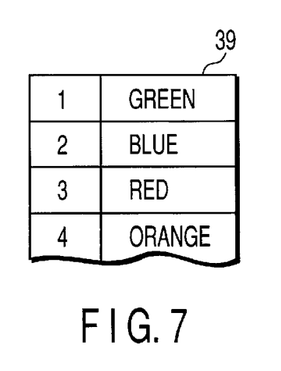
FIG. 7 is a diagram illustrating a color conversion table in the 3-D CAM in the NC process apparatus.

A color conversion table 39, as shown in FIG. 7, stores information for converting the code added to the 3-D model data to color attribute, when a color is to be determined from the color attribute added to the 3-D model data received from the 3-D CAD apparatus 20.

For example, "1" is assigned to green, "2" to blue, and "3" to red. The color attribute on red "1" received from the 3-D CAD apparatus 20 is converted to "3" to recognize red.

The 3-D CAM apparatus 21 comprises a normal coloring section for displaying, on the CAD screen, portions of the product represented by the 3-D model data with different associated colors; a color display section for adding color attribute to process-requiring portions of the work in the 3-D model data and displaying resultant data on the CAD screen, as described above; and a switching section for switching between the normal coloring section and the color display section.

A process path generation section 40 receives the developed data obtained by the developing process section 36, and the color attribute added to the developed data, with respect to one or both of a location of the work, at which an NC process is to be performed (for example, a surface to be processed or a hole to be processed) and a location at which process precision is to be measured, as well as the process type, surface roughness and tolerances of such locations at which the NC process is to be performed or process precision is to be measured. On the basis of the received developed data and color attribute, the process path generation section 40 calculates a path (process path) of a tool, e.g. a cutter, in the NC process machine 24.

An NC data generation section 41 receives the process path from the process path generation section 40 and functions to generate, from the process path, NC data for actuating the NC process machine 24 and performing the NC process.

A program memory 42 stores a program for generating, from the 3-D model data, NC data for actuating the NC process machine 24 and performing the NC process, and a program for developing product data from the 3-D model data, obtaining the developed product data, and displaying the developed product data on the CAM screen of the CAM display section 38.

Furthermore, the program memory 42 stores program for determining the color attribute added by the CAD apparatus 20 from the developed data and for adding the determined color attribute to the developed data which is displayed on CAM display section 38 to display color.

With this program, the manufacturing engineer is enabled to recognize the process-requiring portion of the 3-D model data of the work by color display of blue, green, orange, etc. This process-requiring portion is one or both of a location of the work, at which an NC process is to be performed (for example, a surface to be processed or a hole to be processed)

and a location at which process precision is to be measured. In addition, with this program, the manufacturing engineer is enabled to recognize, on the basis of color-associated information stored in the color-associated information memory section 27, at least the process type, surface roughness and tolerances of one or both of a location of the work, at which an NC process is to be performed (for example, a surface to be processed or a hole to be processed) and a location at which process precision is to be measured.

The CAD/CAM file server computer 22 has a function of receiving the 3-D model data from the 3-D CAD apparatus 20 and storing it. Upon receiving a read instruction from the 3-D CAM apparatus 21, the CAD/CAM file server computer 22 functions to read out the stored 3-D model data and transfer it to the 3-D CAM apparatus 21.

The CAD/CAM file server computer 22 has also a function of receiving the NC data from the 3-D CAM apparatus 21 and storing it in the process database 26. Upon receiving a read instruction from the data transfer apparatus 23, the CAD/CAM file server computer 22 functions to read out the stored NC data from the process database 26 and transfer it to the data transfer apparatus 23.

The data transfer apparatus 23 converts the NC data stored in the process database 26 to a format matching with the type of the NC process machines 24, and transfers the converted NC data to the NC process machine 24.

The operation of the apparatus having the above-described structure will now be described.

In the 3-D CAD apparatus 20, the 3-D CAD model generation section 30 designs a product, while generating a 3-D CAD model, for example, a 3-D CAD model of a casted component, by modeling in an interactive mode with the operator, using a special program (e.g. Pro/ENGINEER) for 3-D product designing.

Figure 8:
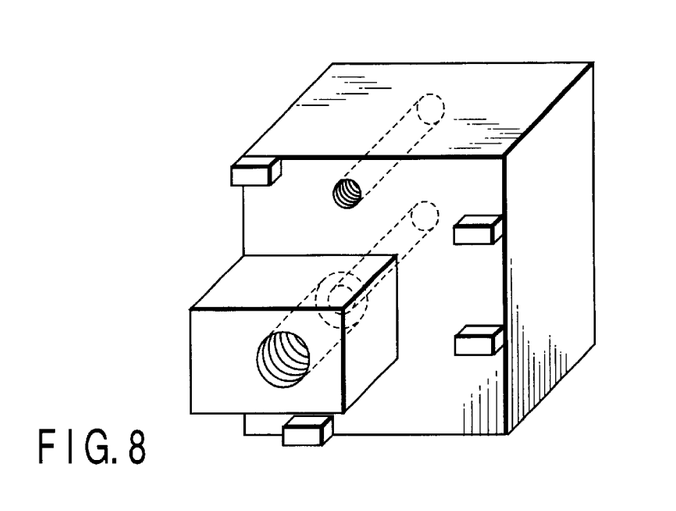
FIG. 8 is a diagram showing a 3-D CAD model produced by the 3-D CAD apparatus in the NC process apparatus.

During the modeling of the 3-D CAD model in the interactive mode with the designer, the 3-D CAD model is displayed on the CAD display section 31 along with the content of conversation with the operator, on the basis of the shape data of the casted component, as shown in FIG. 8.

Assume that the designer has performed an input operation to designate a location of the work, at which an NC process is to be performed (for example, a surface to be processed or a hole to be processed) or a location at which process precision is to be measured. Then, on the basis of color-associated information stored in the color-associated information memory section 27, as shown in FIG. 4, the color attribute addition section 32 selects color attribute of one of blue, green, orange, etc. and adds the selected color attribute to a portion ("process-requiring portion") which requires processing of the 3-D model data. The process-requiring portion corresponds to a location of the work, at which an NC process is to be performed (for example, a surface to be processed or a hole to be processed) or a location at which process precision is to be measured.

In this case, if the designer inputs data on the process type, surface roughness and tolerances of the location at which the NC process is to be performed, the color attribute addition section 32 adds to the process-requiring portion the color attribute corresponding to the data on the process type, surface roughness and tolerances of the location at which the NC process is to be performed, on the basis of the color-associated information stored in the color-associated information memory section 27 shown in FIG. 4.

Figure 9:
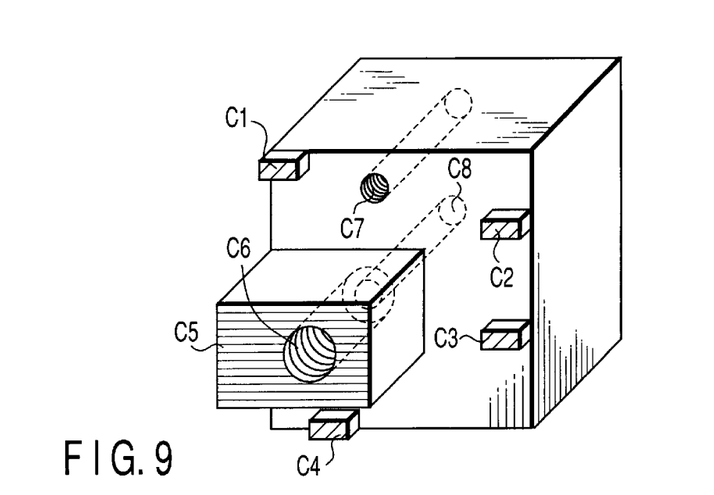
FIG. 9 is a diagram showing a 3-D CAD model to which color attribute displayed on the 3-D CAD/CAM in the NC process apparatus is added.

FIG. 9 shows an example of the 3-D CAD model to which color attribute is added. In the 3-D CAD model, locations C1 to C4 are displayed in green, which indicates that the process type is "SURFACE" and the surface roughness is "ΔΔ". A location C5 is displayed in blue, which indicates that the process type is "SURFACE" and the surface roughness is "Δ". A location C6 is displayed in pink, which indicates that the process type is "HOLE" and the hole type is "STEPPED HOLE". Locations C7 and C8 are displayed in red, which indicates that the process type is "HOLE" and the hole type is "TAP HOLE".

The selection and setting of the color attribute is carried out in the following manner. The display select section 33 of color attribute addition section 32 displays menus or icons for color attribute selection on the CAD screen of the CAD display section 31. The menus or icons indicate, as individual items, the process types such as the surface process or hole process, the level of surface roughness, and tolerances. By the select operations performed with the designer in the interactive mode, color attribute on the process type, such as a surface process or a hole process, the level of surface roughness and tolerances is automatically set.

If the designer performs an input operation to select a colored portion on the CAD screen in order to confirm whether the information on the process type, the level of surface roughness and tolerance has been exactly set, following the addition of the color attribute to the 3-D model data, the display select section 33 displays the set information on the process type, the level of surface roughness and tolerances on the CAD screen of the CAD display section 31.

The 3-D CAD apparatus 20 recognizes the color attribute by coding, for example, red into "1", blue into "2" and green into "3" according to the color conversion table 34 shown in FIG. 6.

The 3-D CAD apparatus 20 then converts the 3-D CAD model, for which modeling and color attribute addition has been completed, by means of the data exchange format such as IGES or STEP, and transmits the converted data to the CAD/CAM file server computer 22.

The CAD/CAM file server computer 22 receives and stores the 3-D model data from the 3-D CAD apparatus 20.

On the other hand, upon receiving a read instruction from the 3-D CAM apparatus 21, the CAD/CAM file server computer 22 functions to read out the stored 3-D model data, which is converted to the data exchange format such as IGES or STEP, and transfer it to the 3-D CAM apparatus 21.

The developing process section 36 of the 3-D CAM apparatus 21 receives, from the 3-D CAD apparatus 20, the 3-D model data which has been converted by means of the data exchange format such as IGES or STEP, and converts it to 3-D model data which can be used in the 3-D CAM apparatus 21. Then, the developing process section 36 develops product data from the converted 3-D model data, acquires the developed product data, and displays the developed data on the CAM screen of the CAM display section 38.

The recognition section 37 discriminates the color attribute added by the 3-D CAD apparatus 20 from the developed data obtained by the developing process section 36. The recognition section 37 adds the discriminated color attribute to the developed data displayed on the CAM screen of the CAM display section 38, and thus displays the colored developed data, thereby enabling the manufacturing engineer to recognize the process-requiring portion of the 3-D model data of the work by color display of blue, green, orange, etc. This process-requiring portion is one or both of a location of the work, at which an NC process is to be performed (for example, a surface to be processed or a hole to be processed) and a location at which process precision is to be measured.

Specifically, the CAM display section 38 of 3-D CAM apparatus 21 displays the locations C1 to C4 in green, location C5 in blue, location C6 in pink and locations C7 and C8 in red, as shown in FIG. 9. With this color display, the manufacturing engineer recognizes that the locations C1 to C4 in green are associated with the process type "SURFACE" and the surface roughness "ΔΔ", the location C5 in blue is associated with the process type "SURFACE" and the surface roughness "Δ", the location C6 in pink is associated with the process type "HOLE" and the hole type "STEPPED HOLE", and the locations C7 and C8 in red are associated with the process type "HOLE" and the hole type "TAP HOLE".

In the 3-D CAM apparatus 21, when a color is to be determined from the color attribute added to the 3-D model data received from the 3-D CAD apparatus 20, "1", for example, is assigned to green, "2" to blue, and "3" to red according to the color attribute conversion information stored in the color conversion table 39 shown in FIG. 7, and the color attribute on red "1" received from the 3-D CAD apparatus 20 is converted to "3" to recognize red.

As has been described above, in the 3-D CAM apparatus 21, the CAM display section 38 displays the locations C1 to C4 in green, location C5 in blue, location C6 in pink, and locations C7 and C8 in red. Accordingly, the manufacturing engineer automatically recognizes the process-requiring portions and process types from the color-displayed locations, instead of recognizing the process-requiring portions and process types by viewing the 2-D drawing. Moreover, the manufacturing engineer can recognize, from the color display, the process type, surface roughness and tolerances at the locations at which the process or measurement is to be performed.

After the locations for the process have been determined, the process path generation section 40, upon receiving an instruction input by the manufacturing engineer, calculates a path (process path) of a tool, e.g. a cutter, in the NC process machine 24, on the basis of the developed data obtained by the developing process section 36 and the color attribute added to the developed data.

The NC data generation section 41 receives the process path from the process path generation section 40 and generates, from the process path, the NC data for actuating the NC process machine 24 and performing the NC process.

The NC data generated by the 3-D CAM apparatus 21 is sent to the CAD/CAM file server computer 22, and stored in the process database 26 of the CAD/CAM file server computer 22.

Upon receiving a read instruction from the data transfer apparatus 23, the CAD/CAM file server computer 22 reads out the stored NC data from the process database 26 and transfer it to the data transfer apparatus 23.

The data transfer apparatus 23 converts the NC data stored in the process database 26 to a format matching with the type of the NC process machines 24, and transfers the converted NC data to the NC process machine 24.

The NC process machine 24 performs an NC process on the work, or a casted work, according to the NC data. In this case, needless to say, the NC process is based on the recognition that the locations C1 to C4 in green, displayed on the CAM display section 38, are associated with the process type "SURFACE" and the surface roughness "ΔΔ", the location C5 in blue is associated with the process type "SURFACE" and the surface roughness "Δ", the location C6 in pink is associated with the process type "HOLE" and the hole type "STEPPED HOLE", and the locations C7 and C8 in red are associated with the process type "HOLE" and the hole type "TAP HOLE".

In the above-described embodiment, the 3-D CAD apparatus 20 is provided with the color attribute addition section 32 for adding color attribute to the process-requiring portion of the 3-D model data of the work. The 3-D CAM apparatus 21 is provided with the recognition section 37 for recognizing the process-requiring portion of the 3-D model data of the work, on the basis of the color attribute added to the 3-D model data.

With the data exchange format such as IGES or STEP, which is the current 3-D model data exchange standard, the information on the process type, surface roughness and tolerances cannot disadvantageously be transferred. The addition of the color attribute makes unnecessary the conventional time-consuming work of producing the material shape or the 2-D drawing.

By directly using the 3-D model data and adding the color attribute, the information on the location on the work, at which the NC process is to be performed (for example, a surface to be processed or a hole to be processed) or the process precision is to be measured, can be transferred to the 3-D CAM apparatus 21.

By adding the color attribute, the process information on the process-requiring location as well as on the process type and tolerances for the process-requiring location can be transferred to the 3-D CAM apparatus 21. There is no need to perform the conventional step of describing the process information, such as the process type and tolerances, on the 2-D drawing.

Since the color attribute is displayed on the CAM display section 38 of the 3-D CAM apparatus 21, the manufacturing engineer can recognize at a glance the location on the work material, at which the NC process is to be performed (for example, a surface to be processed or a hole to be processed) or the process precision is to be measured.

As regards the selection and setting of the color attribute, the CAD screen of the CAD display section 31 displays menus or icons which indicate, as individual items, the process types such as the surface process or hole process, the level of surface roughness, and tolerances. By the select operations performed with the designer in the interactive mode, color attribute on the process type, such as a surface process or a hole process, the level of surface roughness and tolerances is automatically set.

If the designer performs an operation to select a colored portion on the CAD screen in order to confirm whether the information on the process type, the level of surface roughness and tolerances has been exactly set, the display select section 33 displays the set information on the process type, the level of surface roughness and tolerances on the CAD screen of the CAD display section 31. The designer can thus confirm the set information on the process type, the level of surface roughness and tolerances.

Accordingly, the 3-D CAM apparatus 21 reads the color attribute added to the 3-D model data and automatically recognizes the process type, surface roughness and tolerances of the location of the work at which the NC process is to be performed or process precision is to be measured, on the basis of the color-associated information stored in the color-associated information memory section 27. The basic dimensions of the location to be measured can be extracted from the 3-D model data.

Therefore, the designer, after designing the product and component using the 3-D CAD apparatus 20, does not has to take the trouble to prepare a 2-D drawing and describe the information on the dimensions, surface roughness and tolerances on the 2-D drawing. This greatly reduces the number of designing steps.

Moreover, the manufacturing engineer does not need to operate the 3-D CAM apparatus 21 and produce the process path in the interactive manner, by recognizing the process-requiring locations and process types from the 2-D drawing on which the dimensions, surface roughness and tolerances are described.

The manufacturing engineer is also prevented from overlooking the process-requiring locations or erroneously determining the process types.

Furthermore, the work for producing the material shape on the 3-D CAD apparatus, which needs to be performed in the case of applying the method of automatically recognizing the process-requiring location from the formula (material shape—product shape), is not needed.

The program memories 35 and 42 may be provided for storing the program for adding color attribute to the process-requiring portion of the 3-D model data of the casted component, when the 3-D model data representing the 3-D model of the product such as the casted component is converted according to the data exchange format and the converted data is transferred to the 3-D CAM apparatus 21.

In the 3-D CAD apparatus 20 and 3-D CAM apparatus 21, the constituent portions of the product, such as the casted material, represented by the 3-D model data, are colored respectively and displayed on the CAD screen or CAM screen. In addition, the color attribute is added to the process-requiring portions of the casted material and the CAD data with the color attribute is displayed on the CAD screen or CAM screen. These display functions may be effected at the same time or selectively. Therefore, the constituent portions of the casted material are displayed in the associated respective colors and the locations at which the precise process or precision measurement is to be performed are clearly displayed in colors. This makes visual recognition easier.

The present invention is not limited to the above embodiment, and may be modified as follows.

Figure 10:
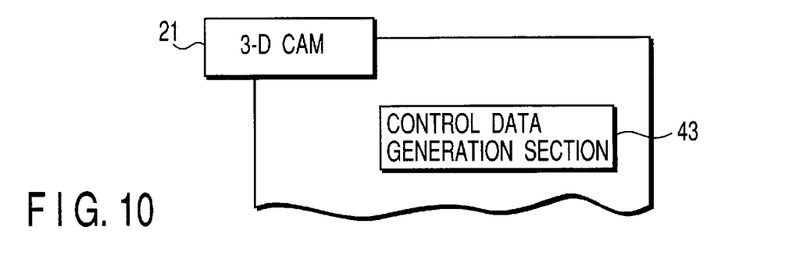
FIG. 10 is a functional block diagram showing a modification of the NC process apparatus.

For example, as shown in FIG. 10, the 3-D CAM apparatus 21 may be provided with a control data generation section 43. The control data generation section 34 has functions of recognizing the measurement location, at which process precision is measured, and the tolerances, on the basis of the color attribute added to the 3-D model data, and automatically producing the control data for a 3-D measuring device on the basis of the recognized measurement location and tolerances.

Colors may be assigned to different degrees of measurement precision. Thereby, the manufacturing engineer can recognize the measurement location and the tolerances of this tolerances without referring to the 2-D drawing.

In the above embodiment, the color is adopted among the attributes possessed by the plural planes, which constitute the 3-D model data, as the means for transferring the process information from the 3-D CAD apparatus 20 to the 3-D CAM apparatus 21 adopts.

However, the line attribute may be adopted as the attributes instead of the color attribute. In this case, line attribute is added to the process-requiring portion, which is processed to manufacture the work represented by the 3-D model data.

The line attribute to be added may represent the thickness or kind of a line (e.g. solid line, broken line, or chain line).

Alternatively, a small hole shape having a small hole diameter (e.g. about $\phi 0.001$ mm), which is not actually processed on the surface or hole to be processed, may be independently added instead of the color attribute and line attribute. Process information may be determined from the diameter of this small hole shape. In this case, table data which is associated with process for a surface by a value having the third decimal point below. The hole shape is interpreted by a CAM apparatus. And then, the interpreted hole shape is subjected to suppression process and then disappears.

Specifically, where the thickness or kind of a line is used as line attribute, a process-requiring location may be indicated by a figure defined by a line with a width of, e.g. 2 mm. In this case, if the process type is "SURFACE", the surface roughness is, e.g. "Δ". If the process type is "HOLE", the hole type is, e.g. "TAP HOLE".

Where the small hole shape, which is not actually processed on the surface or hole to be processed, is used as the line attribute, a small hole with a diameter of $\phi 0.001$ mm, for example, indicates the process type "SURFACE" with the surface roughness "Δ". A small hole with a diameter of $\phi 0.002$ mm, for example, indicates the process type "SURFACE" with the surface roughness "ΔΔ". A small hole with a diameter of $\phi 0.0015$ mm, for example, indicates the process type "HOLE" with the hole type "TAP HOLE".

As has been describe above in detail, the present invention can provide a 3-D CAD/CAM data transfer method capable of transferring process information such as a process location, a process type and tolerances by directly using 3-D model data, without the need to produce a material shape or a 2-D drawing.

This invention can also provide a 3-D CAD apparatus capable of adding process information such as a process location, a process type and tolerances to 3-D model data, without the need to produce a material shape or a 2-D drawing.

This invention can also provide a 3-D CAM apparatus capable of extracting process information such as a process location, a process type and tolerances from 3-D model data transferred from a 3-D CAD apparatus.

This invention can also provide a 3-D CAD/CAM apparatus capable of adding process information such as a process location, a process type and tolerances to 3-D model data, and extracting the process information such as a process location, a process type and tolerances from the 3-D model data, without the need to produce a material shape or a 2-D drawing.

This invention can also provide an NC process apparatus for performing an NC process, with application of a 3-D CAD/CAM apparatus capable of adding process information such as a process location, a process type and tolerances to 3-D model data, and extracting the process information such as a process location, a process type and tolerances from the 3-D model data, without the need to produce a material shape or a 2-D drawing.

This invention can also provide a storage medium storing programs of a 3-D CAD/CAM data transfer method capable of transferring process information such as a process location, a process type and tolerances by directly using 3-D model data, without the need to produce a material shape or a 2-D drawing.

The storage mediums usable in the present invention include magnetic disks, flexible disks, hard disks, optical disks, magneto-optic disks, semiconductor memories, electromagnetic waves modulated by any method of any type, e.g. analog type or digital type, and any means capable of storing software such as programs or data structures in a computer-readable manner.

The computer in this invention is an apparatus capable of reading out software such as programs or data structures stored in the storage medium, and selectively executing physical processes for arithmetic operations, display, storage, etc. on the basis of the read-out result. It is not necessary that this apparatus is contained in one housing. This apparatus may be constructed such that it can perform processes in cooperation with a spatially separated independent device.

As has been described above, according to the present embodiment, when an article is to be manufactured, the designing of the article is performed by the 3D-CAD apparatus. The model data produced by the designing is processed by the 3D-CAM apparatus, and the cutter path of the tool or the assignment of molds is determined in the form of the NC (Numerical Control) program. The NC machining apparatus is driven according to this NC program, and the work is machined. Where necessary, the characteristics of the surface of the machined work are measured. In the course of the series of manufacturing steps, in particular, when the data of the solid model is transferred from the 3D-CAD apparatus to 3D-CAM apparatus, the machining process or specifications, which are intended by the designer of the solid model, can be delivered directly to the CAM apparatus side. Accordingly, the intention of the designer can easily be reflected on the finished article. Moreover, quick designing of manufacturing steps can be realized.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer readable medium comprising:
   computer aided design (CAD) model data; and
   color attribute data for representing a process-requiring portion of the article in said CAD model data, wherein the color attribute data is associated with at least one of a manufacturing process for a surface of the article and a specification of the surface of the article, and the color attribute data is not related to a painting color of the surface of the article.

2. A computer readable medium comprising:
   computer aided design (CAD) model data, for representing an article to be manufactured; and
   line attribute data for representing a process-requiring portion of the article in said CAD model data wherein the line attribute data is associated with at least one of a manufacturing process for a surface of the article and a specification of the surface of the article, and the line attribute data is not related to a painting color of the surface of the article.

3. A method of generating a model for representing an article comprising:
   generating computer aided design (CAD) model data representing a surface of the article to be manufactured and
   adding color attribute data representing a process-requiring portion of the article in said CAD model data, said color attribute data being associated with a manufacturing process for the surface of the article, wherein the color attribute data is not related to a painting color of the surface of the article.

4. A method according to claim 3, wherein the manufacturing process is a forming process.

5. A method according to claim 3, wherein the manufacturing process is a measuring process.

6. A method of generating a model data representing an article to be manufactured comprising:
   generating computer aided design (CAD) model data representing a surface of the article to be manufactured and adding color attribute data representing a process-requiring portion of the article in said CAD model data, said color attribute data being associated with a specification of the surface, wherein the color attribute data is not related to a painting color of the surface of the article.

7. A method according to claim 6, wherein the specification of the surfaces are tolerances of the surfaces.

8. A method according to claim 6, wherein the specification of the surfaces are roughness of the surfaces.

9. A method of generating a model for representing an article to be manufactured comprising:
   generating computer aided design (CAD) surface data representing a surface of the article; and
   adding line attributes being associated with at least one of specification of surfaces of the article and a manufacturing process for the surfaces of the article to one the surface data representing the surface of the article, wherein the line attributes represent a process-requiring portion of the article in said CAD surface data are not related to painting colors of the surfaces of the article.

10. A computer readable medium comprising:
    computer aided design (CAD) model data for representing an article to be manufactured; and
    at least one of a color attribute data and a line attribute data, which represent a process-requiring portion of the article in said CAD model data and which are associated with at least one of a manufacturing process for the surfaces of the article and a specification of surfaces of the article, wherein the at least one of the color attribute and the line attribute is added to data representing at least one surface of the article not related to a painting color of the surface of the article.

11. A computer aided design (CAD) apparatus comprising:
    means for generating CAD surface data representing at least one surface of an article to be manufactured; and
    means for adding at least one of a color attribute data and a line attribute data which are associated with at least one of a manufacturing process for a surface of an article to be manufactured and specification of surfaces of the article to the data representing at least one surface of the article, wherein the at least one of the color attribute data and the line attribute data represents a process-requiring portion of the article in said CAD surface data and is not related to a painting color of the surface of the article.

12. A CAD apparatus according to claim 11,
    further comprising a program for, when a model data having a color attribute associated with at least one of a manufacturing process for a surface of an article and specification of the surface is displayed, changing between a case where the surface is displayed with a color in accordance with the color attribute and a case where the surface is displayed without using the color attribute.

13. A computer readable medium comprising:

means for generating computer aided design (CAD) surface data representing at least one surface of an article to be manufactured; and means for adding at least one of a color attribute data and a line attribute data to the data representing at least one surface of an article to be manufactured, in accordance with a manufacturing process for the surface and specification of the surface, wherein the at least one of the color attribute and the line attribute is not related to a painting color of the surface of the article.

14. A computer aided manufacturing (CAM) apparatus comprising:

means for recognizing a manufacturing process and a specification for a surface of the an article to be manufactured based on a color attribute and line attribute of a computer aided design (CAD) model data representing the article to be manufactured to produce a NC program, wherein at least one of the color attribute data and line attribute data is associated with at least one of the manufacturing process and the specification of the surface, and the at least one of the color attribute data and the line attribute data represents a process-requiring portion of the article in said CAD surface data and is not related to a painting color of the surface of the article.

15. A computer readable medium comprising:

means for recognizing a manufacturing process and a specification surface of an article based on a color attribute data and line attribute data contained in a computer aided design (CAD) model data representing the article to be manufactured, wherein at least one of the color attribute data and line attribute data is associated with at least one of the manufacturing process and the specification of the surface, and the at least one of the color attribute data and the line attribute data represents a process-requiring portion of the article in said CAD model data and is not related to a painting color of a surface of the article.

16. A computer readable medium on which computer aided design (CAD) data of at least one of a color attribute data and a line attribute data is recorded in association with at least one of a manufacturing process and specification with regard to a surface of an article to be manufactured, wherein the at least one of the color attribute data and the line attribute data represents a process-requiring portion of the article in said CAD model data and is not related to a painting color of a surface of the article.

17. A computer readable medium comprising:

means for, when a computer aided design (CAD) model data having a color attribute data associated with at least one of a manufacturing process for a surface of an article to be manufactured and specification of the surface is displayed, changing between a case where the surface is displayed with a color in accordance with the color attribute data and a case where the surface is displayed without using the color attribute data, wherein the color attribute data represents a process-requiring portion of the article in said CAD model data and is not related to a painting color of the surface of the article.

18. A manufacturing process for an article represented as a model data processed by a computer aided design (CAD) apparatus comprising:

producing the CAD model data having a hole shape, wherein the hole shape having a diameter is associated with at least one of a manufacturing process for a surface of the article and a specification of the surface, and the hole shape represents a process-requiring portion of the article in said CAD model data and is not related to shape painting color of the article.

* * * * *